(12) United States Patent
Eaton

(10) Patent No.: US 7,578,069 B2
(45) Date of Patent: *Aug. 25, 2009

(54) AUTOMATED ROBOTIC MEASURING SYSTEM

(75) Inventor: Homer Eaton, Carlsbad, CA (US)

(73) Assignee: Hexagon Metrology, Inc., Norcross, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/614,874

(22) Filed: Dec. 21, 2006

(65) Prior Publication Data

US 2007/0163134 A1    Jul. 19, 2007

Related U.S. Application Data

(63) Continuation of application No. 10/758,697, filed on Jan. 14, 2004, now Pat. No. 7,152,456.

(51) Int. Cl.
*G01B 5/004* (2006.01)

(52) U.S. Cl. .................. 33/503; 33/1 M; 73/1.73; 74/490.05

(58) Field of Classification Search .............. 33/503, 33/1 M; 73/1.79; 414/680, 735; 901/15, 901/28; 74/490.01–490.06; 318/568.11–568.21, 318/568.25
See application file for complete search history.

(56) References Cited

U.S. PATENT DOCUMENTS

| | | | |
|---|---|---|---|
| 2,076,446 A | 4/1937 | Carwardine | |
| 2,787,434 A | 4/1957 | Jacobsen | |
| 3,713,453 A | 1/1973 | Chiaro et al. | |
| 3,757,190 A | 9/1973 | Shelley | |
| 3,944,798 A | 3/1976 | Eaton | |
| 4,016,803 A | 4/1977 | Soby | |
| 4,119,212 A | 10/1978 | Flemming | |
| 4,160,536 A | 7/1979 | Krogsrud | |
| 4,170,824 A * | 10/1979 | Mikulin | 33/30.2 |
| 4,313,263 A | 2/1982 | McMurtry | |
| 4,326,155 A | 4/1982 | Griebeler | |
| 4,382,215 A | 5/1983 | Barlow et al. | |
| 4,388,758 A | 6/1983 | Ernst et al. | |
| 4,459,526 A | 7/1984 | Griebeler | |
| 4,496,279 A | 1/1985 | Langer | |
| 4,575,947 A * | 3/1986 | Stauber | 33/561 |
| 4,593,470 A | 6/1986 | Davies | |
| 4,606,696 A | 8/1986 | Slocum | |

(Continued)

FOREIGN PATENT DOCUMENTS

DE   4345091 A1   7/1995

(Continued)

OTHER PUBLICATIONS

First Office Action in European Application No. 04812142.0—2316 dated Oct. 24, 2008.

*Primary Examiner*—Amy Cohen Johnson
(74) *Attorney, Agent, or Firm*—Knobbe, Martens, Olson & Bear LLP

(57) ABSTRACT

An automated coordinate measuring system comprising a measuring arm used for acquisition of geometry data that incorporates an exoskeletal structure resilient to physical perturbations including thermal changes and vibrations which may affect coordinate data acquisition. The system may be adapted to a portable platform allowing for convenient positioning and alignment of the measuring arm in a wide variety of environments.

11 Claims, 9 Drawing Sheets

U.S. PATENT DOCUMENTS

| | | | |
|---|---|---|---|
| 4,631,404 A | 12/1986 | Burkhardt et al. | |
| 4,667,096 A | 5/1987 | Dangschat | |
| 4,676,002 A | 6/1987 | Slocum | |
| 4,696,202 A * | 9/1987 | Jinriki et al. | 74/490.06 |
| 4,703,443 A | 10/1987 | Moriyasu | |
| 4,718,023 A | 1/1988 | Arora | |
| 4,751,868 A | 6/1988 | Paynter | |
| 4,787,262 A * | 11/1988 | Kozawa et al. | 74/490.06 |
| 4,839,646 A | 6/1989 | Tyson | |
| 4,857,926 A | 8/1989 | Neglia et al. | |
| 4,888,877 A | 12/1989 | Enderle et al. | |
| 4,913,613 A | 4/1990 | Hirschmann | |
| 4,921,393 A | 5/1990 | Andeen et al. | |
| 4,937,759 A | 6/1990 | Vold | |
| 4,953,822 A | 9/1990 | Sharber et al. | |
| 4,984,959 A * | 1/1991 | Kato | 414/744.3 |
| 5,046,992 A * | 9/1991 | Tamai et al. | 474/84 |
| 5,079,500 A | 1/1992 | Oswald | |
| 5,084,981 A | 2/1992 | McCurtry et al. | |
| 5,088,337 A | 2/1992 | Bennet | |
| 5,132,601 A * | 7/1992 | Ohtani | 318/568.1 |
| 5,148,377 A | 9/1992 | McDonald | |
| 5,155,423 A | 10/1992 | Karlen et al. | |
| 5,174,039 A | 12/1992 | Murai | |
| 5,187,874 A | 2/1993 | Takahashi et al. | |
| 5,189,797 A * | 3/1993 | Granger | 33/1 MP |
| 5,293,107 A | 3/1994 | Akeel | |
| 5,396,712 A | 3/1995 | Herzong | |
| 5,402,582 A | 4/1995 | Raab | |
| 5,408,754 A | 4/1995 | Raab | |
| 5,412,880 A | 5/1995 | Raab | |
| 5,505,003 A | 4/1996 | Evans et al. | |
| 5,510,977 A | 4/1996 | Raab | |
| 5,521,847 A | 5/1996 | Ostrowski et al. | |
| 5,528,505 A | 6/1996 | Granger et al. | |
| 5,611,147 A | 3/1997 | Raab | |
| 5,615,489 A | 4/1997 | Breyer et al. | |
| 5,757,499 A | 5/1998 | Eaton | |
| 5,768,792 A | 6/1998 | Raab | |
| 5,796,229 A | 8/1998 | Akeel | |
| 5,822,450 A | 10/1998 | Arakawa et al. | |
| 5,829,148 A * | 11/1998 | Eaton | 33/503 |
| 5,978,748 A | 11/1999 | Raab | |
| 5,991,704 A | 11/1999 | Rekar et al. | |
| 6,134,506 A | 10/2000 | Rosenberg et al. | |
| 6,161,079 A | 12/2000 | Zink et al. | |
| 6,219,928 B1 | 4/2001 | Raab et al. | |
| 6,366,831 B1 | 4/2002 | Raab | |
| 6,428,266 B1 | 8/2002 | Solomon et al. | |
| 6,431,019 B1 | 8/2002 | Greene et al. | |
| 6,478,531 B1 * | 11/2002 | Yang | 414/744.3 |
| 6,598,306 B2 | 7/2003 | Eaton | |
| 6,611,346 B2 | 8/2003 | Granger | |
| 6,611,617 B1 | 8/2003 | Crampton | |
| 6,618,496 B1 | 9/2003 | Tassakos et al. | |
| 6,668,466 B1 | 12/2003 | Bieg | |
| 6,817,108 B2 | 11/2004 | Eaton | |
| 6,819,550 B2 | 11/2004 | Jobs et al. | |
| 6,892,465 B2 | 5/2005 | Raab et al. | |
| 6,896,230 B2 | 5/2005 | Cvek | |
| 6,904,691 B2 | 6/2005 | Raab et al. | |
| 6,925,722 B2 | 8/2005 | Raab et al. | |
| 6,931,745 B2 * | 8/2005 | Granger | 33/503 |
| 6,952,882 B2 | 10/2005 | Raab et al. | |
| 6,984,236 B2 | 1/2006 | Raab | |
| 6,988,322 B2 | 1/2006 | Raab et al. | |
| 7,003,892 B2 | 2/2006 | Eaton et al. | |
| 7,017,275 B2 | 3/2006 | Raab et al. | |
| 7,042,714 B2 | 5/2006 | Hillman et al. | |
| 7,043,847 B2 | 5/2006 | Raab et al. | |
| 7,051,450 B2 | 5/2006 | Raab et al. | |
| 7,073,271 B2 | 7/2006 | Raab et al. | |
| 7,127,938 B2 * | 10/2006 | Takai | 73/105 |
| 7,152,456 B2 * | 12/2006 | Eaton | 73/1.79 |
| 7,174,651 B2 | 2/2007 | Raab et al. | |
| 7,246,030 B2 | 7/2007 | Raab et al. | |
| 7,269,910 B2 | 9/2007 | Raab et al. | |
| 7,296,979 B2 | 11/2007 | Raab et al. | |
| 7,372,581 B2 | 5/2008 | Raab et al. | |
| 7,395,606 B2 * | 7/2008 | Crampton | 33/503 |
| 7,441,341 B2 * | 10/2008 | Eaton | 33/503 |
| 2005/0166413 A1 | 8/2005 | Crampton | |
| 2007/0063500 A1 | 3/2007 | Eaton | |

FOREIGN PATENT DOCUMENTS

| | | |
|---|---|---|
| DE | 101 12 977 | 11/2002 |
| EP | 0522610 | 6/1992 |
| FR | 2740546 | 1/1998 |
| GB | 2097359 | 11/1982 |
| GB | 2274526 A | 7/1994 |
| GB | 0309662.5 | 4/2003 |
| GB | 0312963.2 | 6/2003 |
| GB | 0327503.9 | 11/2003 |
| GB | 0405396.3 | 3/2004 |
| JP | 01222883 | 9/1989 |
| JP | 04057690 | 2/1992 |
| JP | 04-032393 | 5/1992 |
| JP | 05-031685 | 2/1993 |
| JP | 2003-021133 | 1/2003 |
| JP | 2003/175484 | 9/2003 |
| JP | 2003275484 | 9/2003 |
| JP | 2006-214559 | 8/2006 |
| WO | WO 98/08050 | 2/1998 |
| WO | WO 2004/096502 | 11/2004 |

* cited by examiner

| AXIS | A | B | C | D | E | F | G |
|---|---|---|---|---|---|---|---|
| 720 ⟩ Gear Ratio (Outer Member) | 400 | 400 | 400 | 400 | 200 | 200 | 100 |
| 725 ⟩ Encoder Resolution (Outer Member / cycles per revolution) | 1000 | 1000 | 1000 | 1000 | 1000 | 1000 | 1000 |
| 730 ⟩ Encoder Resolution (Inner Member / cycles per revolution) | 5000 | 5000 | 5000 | 5000 | 5000 | 5000 | 5000 |
| 735 ⟩ Articulation Angle (Outer Member) | 90° | 20° | 30° | -10° | 90° | -90° | 60° |
| 705 ⟩ Actuator Position (Encoder Cycles) | 100,000.00 | 22,222.22 | 333,333.33 | -11,111.11 | 50,000.00 | -50,000.00 | 16,667.67 |
| 710 ⟩ Inner Member (Encoder Cycles) | 1250.00 | 277.73 | 416.67 | -138.89 | 1250.00 | -1250.00 | -833.33 |

FIG.7

AUTOMATED ROBOTIC MEASURING SYSTEM

RELATED APPLICATIONS

This application is a continuation of U.S. application Ser. No. 10/758,697 filed Jan. 14, 2004 entitled "AUTOMATED ROBOTIC MEASURING SYSTEM," which is incorporated herein by reference in its entirety. This application incorporates by reference in its entirety the following application: U.S. application Ser. No. 10/758,696 filed Jan. 14, 2004 entitled "TRANSPROJECTION OF GEOMETRY DATA."

BACKGROUND

1. Field of the Invention

The present teachings generally relate to rectilinear measuring systems and articulated arm coordinate measuring machines and more particularly to a system for automated measuring arm positioning.

2. Description of the Related Art

Rectilinear measuring systems, also referred to as coordinate measuring machines (CMM's) and articulated arm measuring machines including portable coordinate measuring machines (PCMM's) have been described for generating geometry information from various objects and areas. In general, these instruments capture the structural characteristics of an object for use in electronic rendering and duplication. One example of a conventional apparatus used for coordinate data acquisition comprises a support and a moveable measuring arm made up of hinged segments to which a contact-sensitive probe or remote scanning device is attached. Geometry information or three-dimensional coordinate data characterizing the shape, features, and size of the object may be acquired by tracing or scanning along the object's surface and contours. Probe or scanning device movement is typically tracked relative to a reference coordinate system resulting in a collection of data points and information that may be used to develop an accurate electronic rendering of the object. In conventional implementations, the acquired geometry information is processed by a computer capable of making use of the information to model the surface contours and dimensions of the object.

One limitation of many conventional instruments is that they are generally sensitive to external physical perturbations including vibrations and fluctuations in temperature which may degrade the accuracy of coordinate acquisition. For example, it may be necessary to perform coordinate calibration processes several times in a particular environment where the ambient temperature changes even a few degrees to compensate for thermal expansion and contraction of joints and components in an instrument. In articulated measuring arms, the components that make up the arm segments and hinged portions of the measuring arm are particularly susceptible to localized thermal effects affecting the performance of the instrument and can impart undesirable distortions and inaccuracies in coordinate acquisition. Additionally, imperfections in hinge, actuator, and motor design can result in a certain degree of variability or "slop" in measuring arm movement further affecting the overall instrument accuracy.

Another problem with existing designs is that inadvertent jarring of the instrument by an operator or other vibrations may result in degradation of coordination acquisition performance. Consequently, conventional instruments must be treated as highly-sensitive pieces of equipment and are generally set up in a controlled environment to insure maximum accuracy and reliability. Despite these considerations it is not uncommon for an instrument to require realignment or recalibration during routine operation thus increasing the time required to obtain a complete coordinate set for a selected object.

For the aforementioned reasons of environmental sensitivity as well as the generally large overall size, weight, and complexity of the instrument itself, conventional instruments are also not well suited for adaptation to portable platforms which include motor-assisted measuring arm articulation or robotic control. Development of a powered means for assisting in measuring arm positioning presents a number of design considerations that should be addressed to insure sufficient reliability and precision in coordination acquisition. These factors include evaluating how motors and actuators should be positioned about the measuring arm to reduce or offset thermal effects as well as considering how these components might best be positioned to increase overall stability and reduce vibrations affecting the instrument.

From the foregoing it will be appreciated that there is a need for an improved means of vibration damping and thermal compensation in coordinate acquisition instruments including CMMs and PCMMs. Additionally, there is a need for an instrument platform capable of motor-assisted or robotically controllable movement that is relatively easy to calibrate and retains a high degree of accuracy and sensitivity. Such an instrument would be of substantial benefit in a number of different applications and provide increased flexibility over conventional designs.

SUMMARY

The present teachings relate to an articulated arm coordinate measuring machine (CMM) having improved tolerance to external physical perturbations. In various embodiments, the CMM comprises a measuring arm having a coordinate acquisition probe or remote scanning device attached thereto coupled with a powered exoskeletal frame and other components that provide improved vibration and temperature damping characteristics over conventional designs.

In one aspect, the exoskeletal frame and other components that make up the apparatus for actuator assisted movement of the measuring arm may be adapted for use with existing CMM's thus providing a means to improve the performance of these devices. In another aspect, the present teachings describe a configuration for a CMM capable of robotic or motor-assisted movement. Actuators provide movement for the measuring arm and may be remotely located at various positions on the measuring arm or separately contained in an external housing to improve stability and coordinate acquisition accuracy. In certain embodiments, the actuators remotely drive selected hinge, joint, or measuring armature segments using flexible drive cables which enable multi-axis control and movement of the measuring arm, probe, and/or remote scanning device.

In still other embodiments, the present teachings describe a robotically-assisted PCMM that may be operated in a power-assisted manual mode. The PCMM is capable of withstanding various vibrations and jarring effects through a vibration damping system between the exoskeletal frame and the measuring arm. The PCMM may be configured to recognize when the measuring arm has become mispositioned and may compensate or realign the measuring arm as desired or instructed.

In another aspect, the present teachings describe a system for calibrating and training a CMM. Calibration may be performed in a substantially automated manner or alternatively an operator-assisted mode may be used. Once a training parameter set has been developed, this information may be applied to other similar CMMs improving the efficiency of device calibration or substantially eliminating this process altogether.

In other embodiments, the present teachings describe a process for determining the position of the measuring arm using encoders which detect the angular position of both the measuring arm and the exoskeletal frame relative to one another. Actuator positioning information stored in a lookup table in combination with encoder determined angular values provides a highly accurate database for aligning the measuring arm and providing feedback to correct/adjust the position of the measuring arm.

In various embodiments, the invention comprises a positioning system for accurately orienting an articulated arm. The system further comprises an articulated supporting arm comprising a plurality of jointedly interconnected support arm segments moveable about a plurality of axes; a plurality of compliant members positioned on said supporting arm; and an articulated measuring arm comprising a plurality of jointedly interconnected measuring arm segments capable of a plurality of degrees of freedom of movement and supported by said compliant members wherein said compliant members provide a yielding characteristic between the articulated supporting arm and the articulated measuring arm.

In other embodiments, the invention comprises an accurate positioning system. The system further comprises an articulated supporting arm comprising a plurality of jointedly interconnected support arm segments moveable about a plurality of axes; a plurality of compliant members positioned about said supporting arm; an articulated measuring arm comprising a plurality of jointedly interconnected measuring arm segments capable of a plurality of degrees of freedom of movement and supported by said compliant members wherein said compliant members provide a yielding characteristic between the articulated supporting arm and the articulated measuring arm. A controller is further configured to direct positioning of the articulated supporting arm and a datastore containing information that is accessible by the controller is used to resolve the alignment of the articulated supporting arm with respect to the articulated measuring arm.

In still other embodiments, the invention comprises a method for positioning an articulated measuring arm. The positioning method further comprises supporting said arm at a plurality of locations with compliant members to reduce mechanical stress on said arm.

In another embodiment, the invention comprises a method for damping external perturbations encountered by an articulated measuring arm. The method further comprises supporting said arm at a plurality of locations with compliant members that position at least a portion of the articulated measuring arm within an exoskeletal structure.

In yet another embodiment, the invention comprises a method for directing positioning of an articulated positioning arm and an interconnected articulated measuring arm. The method further comprises the steps of: (a) identifying a plurality of instructions used by a controller to direct positioning of the articulated positioning arm in a plurality of orientations; (b) measuring the resulting position of the articulated measuring arm arising from each controller instruction; and (c) associating and storing the instructions and the resulting positionings thereafter to be used by the controller to effectuate a selected positioning.

In still other embodiments, the invention comprises a positioning system for directing positioning of an articulated arm. The system further comprising: an articulated arm comprising jointedly interconnected arm segments moveable about at least one degree of freedom; an articulation member configured to position the jointedly interconnected arm segments; and a remotely located actuator interconnected to the articulation member by a drive member, wherein the actuator generates a motive force transmitted through the drive member to the articulation member directing positioning by the articulation member and effectuating movement of the positioning arm.

BRIEF DESCRIPTION OF THE DRAWINGS

FIG. 7 illustrates an exemplary lookup table used in conjunction with the automated robotic measuring system.

DETAILED DESCRIPTION OF CERTAIN EMBODIMENTS

The following detailed description presents various descriptions of certain embodiments of the present teachings described herein. However, the inventive scope of the present teachings can be embodied in a multiplicity of different ways as defined and covered by the claims. In this description, reference is made to the drawings wherein like parts are designated with like numerals throughout.

Figure 1:
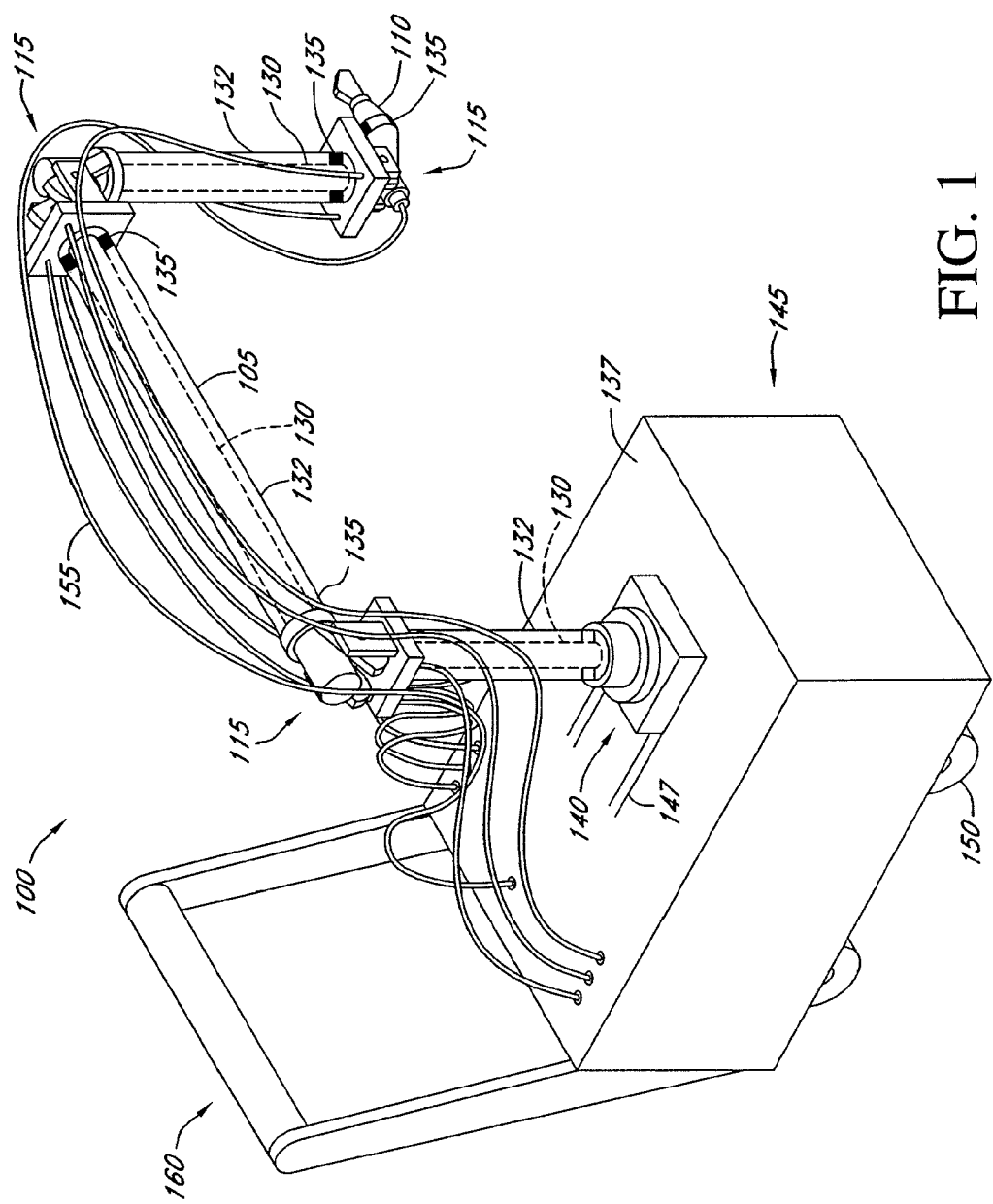
FIG. 1 illustrates one embodiment of an automated robotic measuring system according to the present teachings.
Figure 3:
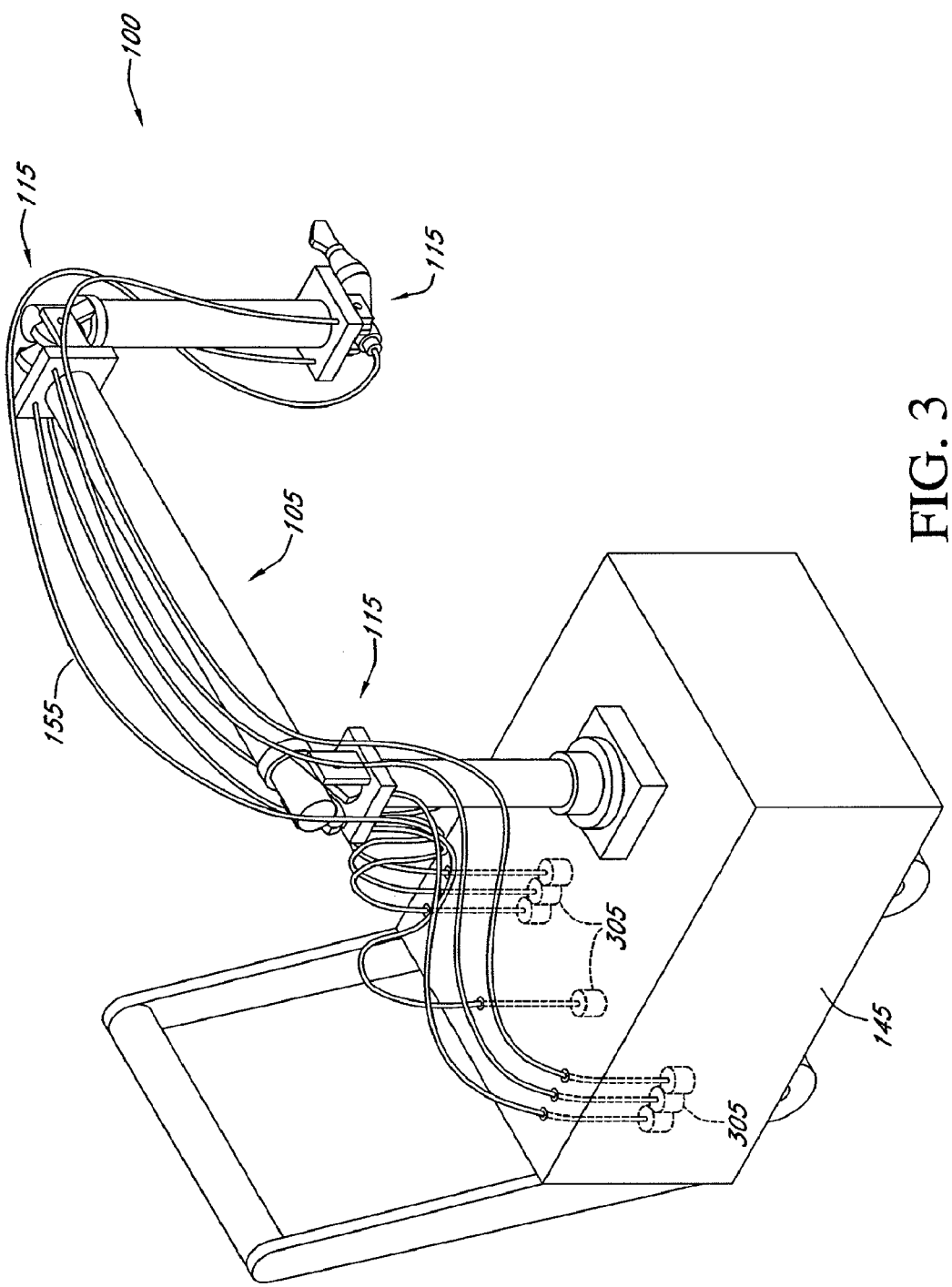
FIG. 3 illustrates an exemplary actuator configuration for the automated robotic measuring system.
Figure 4:
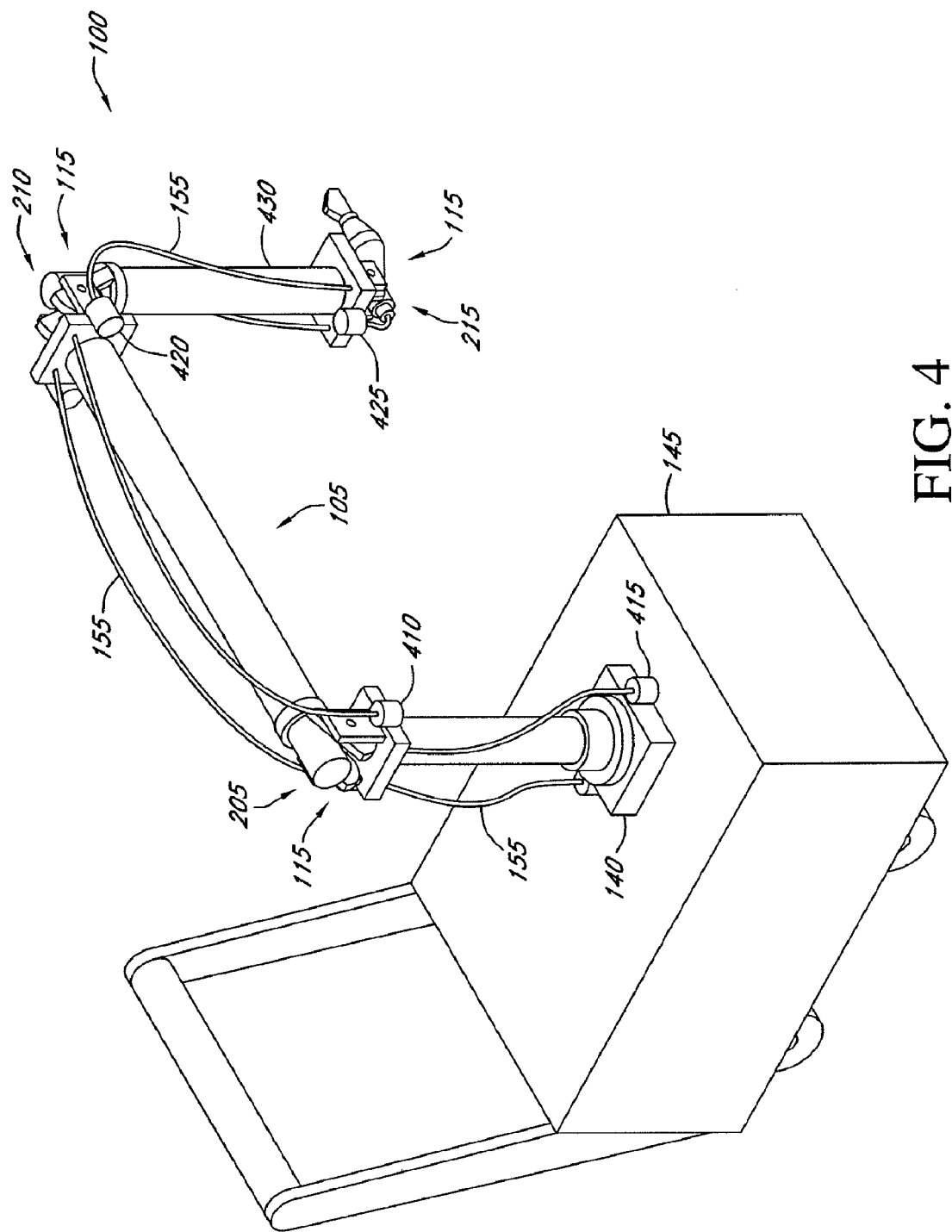
FIG. 4 illustrates another exemplary actuator configuration for the automated robotic measuring system.

While various embodiments of the present teachings are directed towards an automated robotic measuring system or a motor-assisted coordinate measuring machine; one skilled in the technology will appreciate that the systems and methods described herein may be adapted for use with other types of CMMs and PCMMs. For example, the vibration damping and thermal compensation features may be adapted for use with conventional designs to improve their resistance to external perturbations. Similarly, the motor-assisted control and movement characteristics of the present teachings may be adapted for use with conventional CMM designs to improve the precision and accuracy of these assemblies. It should be noted that the motor-assisted designs illustrated in the FIGS. 1, 3, and 4 are but various representative embodiments of the scope of the present teachings. It will be appreciated that the invention is not limited exclusively to these embodiments, but rather includes additional implementations as well.

In various embodiments, the automated robotic measuring system comprises an "arm within an arm" or dual-positioning member design wherein a measuring arm to which a coordinate acquisition member or probe is attached is adapted for use with a positioning member comprising a shell or arm alignment structure. In certain embodiments, the positioning member forms an exoskeletal structure which at least partially encloses portions of the measuring arm, although the positioning member is not necessarily limited to this particular configuration.

The measuring arm and positioning member are interconnected by way of deformable compliant members or support webs which align the measuring arm and positioning members with respect to one another and aid in detecting loads imparted upon either component. In one aspect, detected loads serve as a basis for providing power-assisted movement of the arm members in various controllable manners. The exoskeletal or alignment structure further serves as a physical perturbation damping means which contributes to improved stability and accuracy of the measuring arm to which the coordinate acquisition or probe member is attached thereby improving the performance of the instrument.

As will be described in greater detail hereinbelow, the automated robotic measuring system of the present teachings differs from traditional or conventional designs in that the first measuring arm member is driven by the positioning member using an actuator and encoder-based control system instead of a robotic system employing a singular arm member designed for both movement and measurement. This difference in design is significant as it increases measuring arm stability, allows for finer and more precise movement, and contributes to improved measurement accuracy.

FIG. 1 illustrates an exemplary automated robotic measuring system 100 according to the present teachings. The system 100 comprises a coordinate measuring machine having an articulated measuring arm 105 to which a coordinate acquisition member 110 is mounted. The measuring arm 105 is used to align the coordinate acquisition member 110 in various spatial orientations through a plurality of articulation members 115 each of which impart one or more rotational or angular degrees of freedom to the measuring arm 105 to thereby allow fine positioning of the coordinate acquisition member 110 in three dimensional space.

In various embodiments, the coordinate acquisition member 110 comprises a contact sensitive member or probe configured to engage the surfaces of a selected object and generate coordinate data on the basis of probe contact as directed through the measuring arm 105. Alternatively, the coordinate acquisition member 110 may comprise a remote scanning and detection component that does not necessarily require direct contact with the selected object to acquire geometry data. In the illustrated embodiment, a laser coordinate detection device (e.g. laser camera) may be used to obtain geometry data without direct object contact. In the present teachings, acquisition of coordinate data is generally described in the context of the laser coordinate detection device; however it will be appreciated that the system and methods described herein may be readily adapted to numerous different configurations to achieve other manners of coordinate data acquisition. Commercial implementations of contact sensitive probes and laser coordinate detection devices have been described elsewhere and are available from Romer/Cimcore (Carlsbad, Calif.). For example, it will be appreciated that various coordinate acquisition member configurations including: a contact-sensitive probe, a remote-scanning probe, a laser-scanning probe, a probe that uses a strain gauge for contact detection, a probe that uses a pressure sensor for contact detection, a probe that used an infrared beam for positioning, and a probe configured to be electrostatically-responsive may be used for the purposes of coordinate acquisition.

In various embodiments, the measuring arm 105 comprises a composite structure having a plurality of hingedly connected measuring arm segments each of which comprises inner member measuring arm segments (inner members) 130 and outer member exoskeletal frame positioning segments (outer members) 132. The inner member measuring arm segments 130 are interconnected to one another through swiveling joints and provide the ability to position the coordinate acquisition member 110 in a variety of different orientations in three dimensional space. The outer member positioning segments 132 surrounding various portions of the inner members 130 form an environmental barrier that substantially encloses portions of the inner members 130. In one aspect, the inner members 130 are configured to "float" inside the outer members 132 with the outer members 132 providing powered movement to the inner members 130.

Spacing and alignment of the inner 130 and outer 132 members is accomplished by way of a plurality of compliant members 135. Although illustrated as substantially enclosing the inner members 130, it will be appreciated that in various embodiments the outer members 132 of the exoskeletal frame may only partially enclose portions of the inner members 130 of the measuring arm 105 or alternatively may not enclose the inner members 130 of the measuring arm 105 at all but rather be interconnected by way of the compliant members 135 in other manners wherein the outer members 132 of the exoskeletal frame are still able to provide the desired vibration and thermal damping features described in greater detail hereinbelow.

In various embodiments, the outer members 132 comprising the exoskeletal frame may be constructed from a variety of materials including for example: composite materials such as carbon fiber; synthetic plastics or resins; and metals or metal alloys. The exoskeletal frame desirably possesses physical characteristics which may include sufficient rigidity to retard deformation under load; low thermal expansion properties; relatively light weight; chemical and electromagnetic radiation resistance; vibration damping characteristics and other such properties. In one aspect, the outer members 132 serve as a shell or enclosure for various portions of the measuring arm 105 and partially or fully shield or dampen the inner members 130 against undesirable physical perturbations including temperature fluctuations and vibrations. In certain embodiments, the exoskeletal frame may be adapted for use with the measuring arm of a conventional CMM instrument to desirably impart the aforementioned features and dampening characteristics. Alternatively, a customized coordinate measuring machine having fully integrated inner member measuring arm segments 130 and exoskeletal frame positioning segments 132 may be developed in a variety of different shapes, sizes, and configurations to accommodate various different applications.

In one aspect, the measuring arm 105 may be secured to a support surface 137 at its base 140 wherein the support surface 137 represents a stable surface such as a table, floor, or wall or alternatively the support surface 137 may be contained on a mobile unit 145 used for conveniently moving the measuring arm 105 and associated components from one place to another. The illustrated mobile unit 145 and associated measuring arm 105 represent one possible embodiment of a PCMM 100 in accordance with the present teachings. Here, the measuring arm 105 may be secured to the mobile unit 145 in a fixed manner (e.g. bolted or fastened to the mobile unit 145 at a selected location) or alternatively a rail system 147 may be incorporated into the mobile unit design allowing the measuring arm 105 to be conveniently positioned and secured in a more adjustable manner by slideable movement along the rail 147 to a desired location.

The mobile unit 145 may further be configured with retractable or drop-down wheels 150 which facilitate moving the apparatus. When properly positioned, the wheels 150 may be retracted and rigid support legs (not shown) may be used to secure the mobile unit 145 in a fixed position to provide a stable support surface for the measuring arm 105 to perform coordinate data acquisition.

In various embodiments, the mobile unit 145 may comprise a cabinet having sufficient space to store actuators used to position the outer members 132 as well as other instruments and components associated with the PCMM 100 such as computers, power supplies, cabling, gears, etc. The PCMM 100 may additionally incorporate a handle or push-bar assembly 160 that facilitates manually moving and positioning the apparatus 100. Alternatively, the mobile unit 145 may include a powered means of locomotion and steering allowing the PCMM 100 to be remotely controlled and positioned.

The measuring arm 105 and coordinate acquisition member 110 may be manually, robotically, or semi-robotically operated as will be described in greater detail hereinbelow adjusting their position and thereby orienting the coordinate acquisition member 110 in various desired positions. In various embodiments, the articulation members 115 are not engaged directly via an actuator or motor but rather respond to force exerted by various outer members 132. The outer members 132 are operated by transmission of force and/or torque through flexible drive cables 155 which allow actuators, motors, or other devices to be remotely located relative to the outer members 132 and associated articulation member(s) 115. The drive cables 155, the actuator or other force-generating device may be used to direct the positioning of the articulation members 115 with a high degree of precision and control as will be described in greater detail hereinbelow. In general, the actuators or motors are used to angularly position the outer members 132 which in turn impart a moving force that positions the inner member(s) 130 in a desired manner.

In one aspect, remote positioning of the actuators is desirable as this allows for the heat and weight associated with the actuators to be displaced from the articulation member 115 it is used to drive. Such a configuration may also reduce vibrations and reflected load resulting from operation of the actuators to improve the overall accuracy and performance. As will be shown in subsequent illustrations, the actuators may be positioned within the mobile unit 145 to provide a substantially self-contained instrument wherein the drive cables 155 extend from the mobile unit 145 and are attached to selected outer member aligning components associated with the articulation members 115 of the measuring arm 105. Remote mounting of the actuators in the aforementioned manner desirably reduces or eliminates sources of substantial physical perturbations that might otherwise affect the performance of the instrument and desirably displaces weight associated with the actuators to promote measuring arm stability (e.g. providing a favorable center of gravity).

Figure 2A:
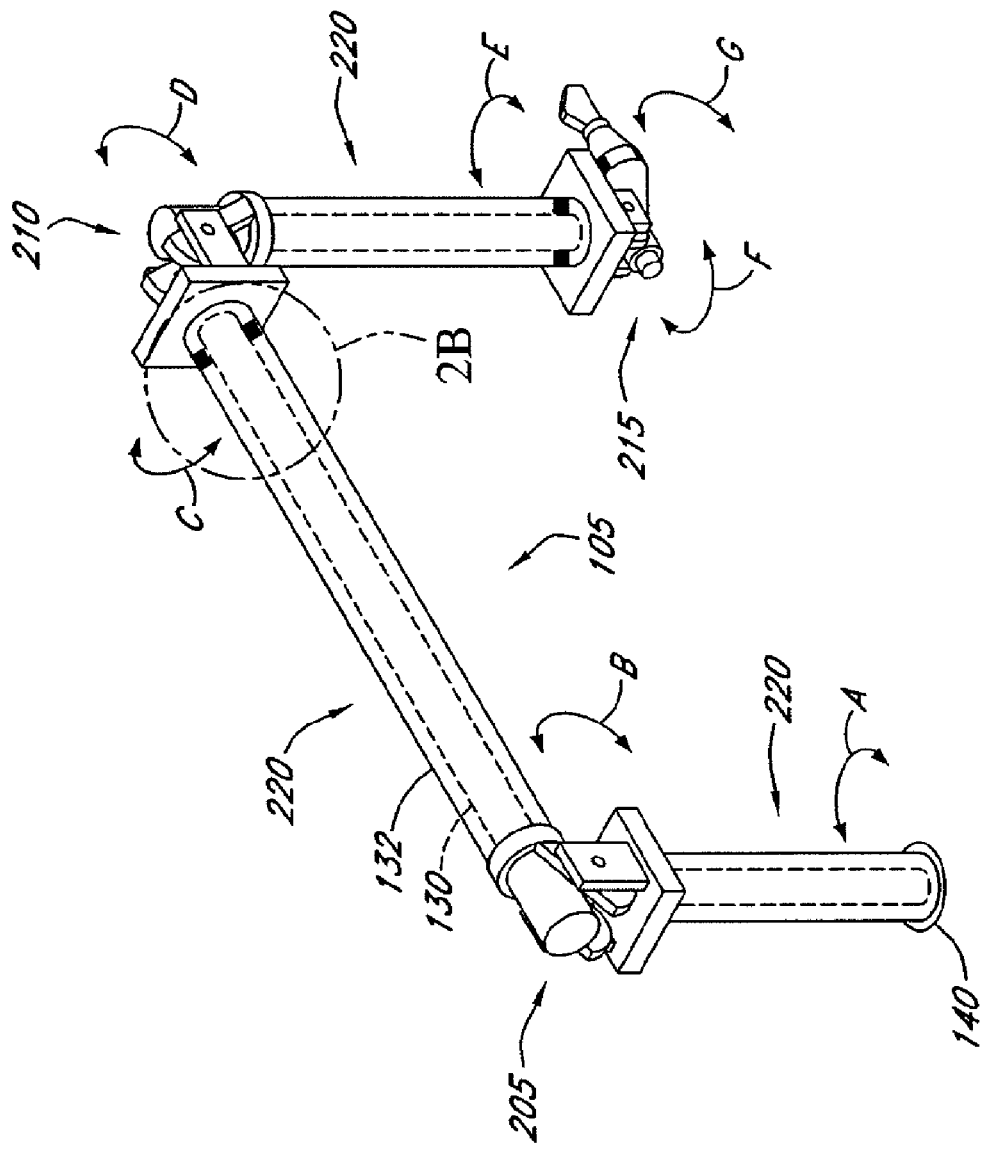
FIG. 2A illustrates an exemplary articulated measuring arm and ranges of movement imparted by various articulation members.

FIG. 2A illustrates some of the possible ranges of movement or angular deflections of the measuring arm 105 imparted by the various articulation members 115 which are responsive to movement of the outer members 132. In one aspect, the measuring arm 105 may be analogized to a human arm having a shoulder joint 205, elbow joint 210, and wrist joint 215 with interposing measuring arm sections 220 comprising the inner and outer members 130, 132. Together these joints 205, 210, 215 and measuring arm sections 220 provide seven rotary axes of movement with an additional linear axis of movement provided by the aforementioned rail system 147. It will be appreciated, however, that there is no strict limitation to the number of axes of movement that may be used and fewer or additional axes of movement may be incorporated into the PCMM design without departing from the scope of the present teachings.

For the purpose of illustration, a plurality of rotational axes and associated angular deflections are shown for the various joint elements of the measuring arm 105. For example, the 'A' axis represents a rotational degree of freedom about the base portion 140 of the measuring arm 105. In a similar manner, the 'B' axis represents a rotational degree of freedom about the shoulder joint 205. The 'C' axis represents a rotational degree of freedom about the shoulder/elbow section. The 'D' axis represents a rotational degree of freedom about the elbow joint 210. The 'E' axis represents a rotational degree of freedom about the elbow/wrist section 220. The 'F' axis represents rotational degree of freedom about the wrist joint 215. Finally, the 'G' axis represents a rotational degree of freedom about the coordinate acquisition member. In various embodiments, the angular deflections associated with each axis or joint may be configured independently. For example, each axis may have a selected angular deflection which provides a limited range of motion to the associated arm sections or alternatively each selected axis may be configured with substantially infinite range of motion through rotatable joint elements. Additional details of the application of infinitely rotatable joint elements in CMM design as well as further description of the various other components associated with coordinate measuring devices are described in U.S. Pat. No. 5,829,148 entitled "Spatial Measuring Device" which is incorporated by reference in its entirety.

It will be appreciated that the aforementioned rotational axes and associated angular deflections are meant to be illustrative only and that other axes and ranges of motion may be used which may be more or less restrictive in nature. In one aspect, the combination of different joints and their associated angular deflections or ranges of movement provide for a highly flexible means by which the coordinate acquisition member 110 may be positioned and oriented. As previously described, each joint may be associated with an articulation member 115 that may be remotely driven via an associated outer member and actuator interconnected via a flexible drive cable thereby providing a means for finely controllable movement and positioning of the measuring arm 105. Further details of how the actuators can be arranged with respect to the articulation members 115 and measuring arm 105 will be described in greater detail in subsequent figures and discussion.

Figure 2B:
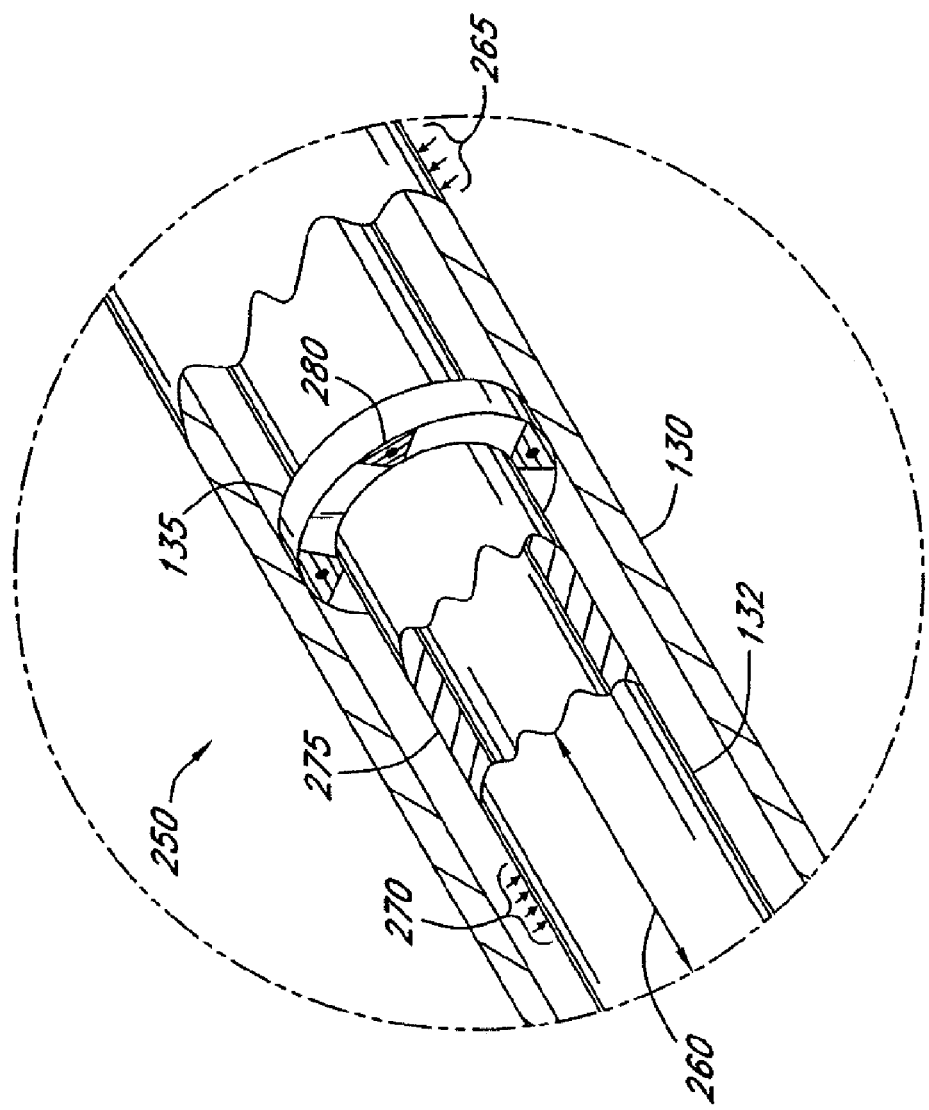
FIG. 2B illustrates an exploded view of a portion of the measuring arm shown in FIG. 2A exemplifying the interconnection between inner and outer members.

FIG. 2B illustrates an exploded view 250 of a portion of the measuring arm 105 shown in FIG. 2A that details the interconnection between the compliant members or bushings 135 and the inner and outer members 130, 132 of the measuring arm 105. In one aspect, the compliant members 135 are formed from a resilient deformable material such as soft plastic or rubber which allows positioning of the inner member 130 within the outer member 132. A plurality of such compliant members 135 may be used throughout the measuring arm 105 to maintain a desired orientation between various arm segments in which the inner and outer members 130,132 are substantially aligned along a longitudinal axis 260.

The deformable nature of the material used in the compliant member 135 allows for a certain degree of compressibility in the compliant member 135 when sufficient force or torque 265, 270 is applied to either the inner or outer members 130, 132. As will be described in greater detail hereinbelow, this quality of deformability serves a number of useful purposes which may include imparting a vibration dampening quality to the measuring arm 105. For example, vibrations which occur in the outer member 132 may not necessarily be transmitted to the inner member 130 by virtue of the compliant member 135 which at least partially absorbs the vibrations. This feature of the compliant member 135 is useful in that it acts to buffer the inner member 130 from outside physical perturbations which might otherwise result in misalignment or misregistration by the coordinate acquisition member 110.

In a similar manner, the compliant member 135 being interposed between the inner and outer members 130, 132 creates a temperature buffer that reduces changes in the ambient temperature surrounding the outer member 132 and localized "hot" spots created near operating actuators/motors from being transmitted to the inner member 130 to a significant degree. In one aspect, a gap 275 created between the inner and outer members 130, 132 by the compliant member 135 serves to isolate the inner member 130 from undesirable thermal changes which might occur in or about the outer members 132. Thermal stability is a significant concern in measuring arm performance as changes in temperature may result in expansion or contraction of the arm sections and/or joints and may contribute to misalignment and deviations from calibrated movement. In one aspect, the materials from which the compliant members 135 are constructed also promote thermal stability in the inner member 130 by acting as an insulator to heat transfer. Thus, the exoskeletal structure of the outer members 132 desirably contributes to improved measuring arm data acquisition stability and precision. Furthermore, the exoskeletal structure used in connection with the measuring arm potentially reduces the frequency of re-calibration that might otherwise be necessary as compared to conventional measuring arms operating in similar environments.

In certain embodiments, one or more pressure sensors or strain gauges 280 may be associated with each compliant member 135. The pressure sensors or strain gauges 280 permit a measurement of the degree or magnitude of deformation associated with a selected compliant member 135. Deformation in the compliant member 135 is generally indicative of torque, force, or load applied to either the inner or outer members 130, 132 relative to one another. Information provided by the pressure sensor 280 characterizing the deformation load may be used to supply feedback data to a controller which may in turn instruct a preselected movement function or operation to be carried out by the actuator based upon the degree of deformation detected by the pressure sensor 280. For example, the pressure sensors 280 may be used to identify the general location, magnitude, and direction of an external load applied to the outer member 130. The controller may respond to the external load by directing selected actuators to drive articulation members 115 to generate an "opposing-force" to resist or compensate for the external load and prevent undesired movement of the measuring arm 105.

In a similar manner, the controller may respond to the detected external load by directing actuators to drive selected articulation members 115 to move in a direction generally "in-line" with the applied load. These operations provide a basis for motor-assisted movement of the measuring arm 105 wherein application of force or load on the measuring arm 105 or the coordinate acquisition member 110 causes the arm 105 to move at a predetermined rate in a selected direction. As will be described in greater detail hereinbelow, motor-assisted movement may be desirably applied in a "teaching mode" wherein an operator at least partially directs the movement of the measuring arm 105 aided by the controller-directed actuator movement of the articulation members 115.

In other embodiments, the controller may direct the speed and direction of movement of the measuring arm 105 on the basis of the magnitude of load applied to the inner or outer members 130, 132 as detected by the one or more pressure sensors 280. Additionally, in certain embodiments if the inner member 132 experiences a suddenly applied load, such as that encountered if the coordinate acquisition member 110 is jarred or inadvertently moved from a desired position, the load applied to the inner member 132 or coordinate acquisition member 110 may be detected by the pressure sensors 280. The detected load may further trigger the controller to issue corrective or compensatory feedback to one or more actuators and associated articulation members 115 to thereby return the coordinate acquisition member 110 to its previous position. Such a feature is useful to maintain proper alignment and positioning of the coordinate acquisition member 110 even when accidentally or inadvertently mispositioned.

Figure 2C:
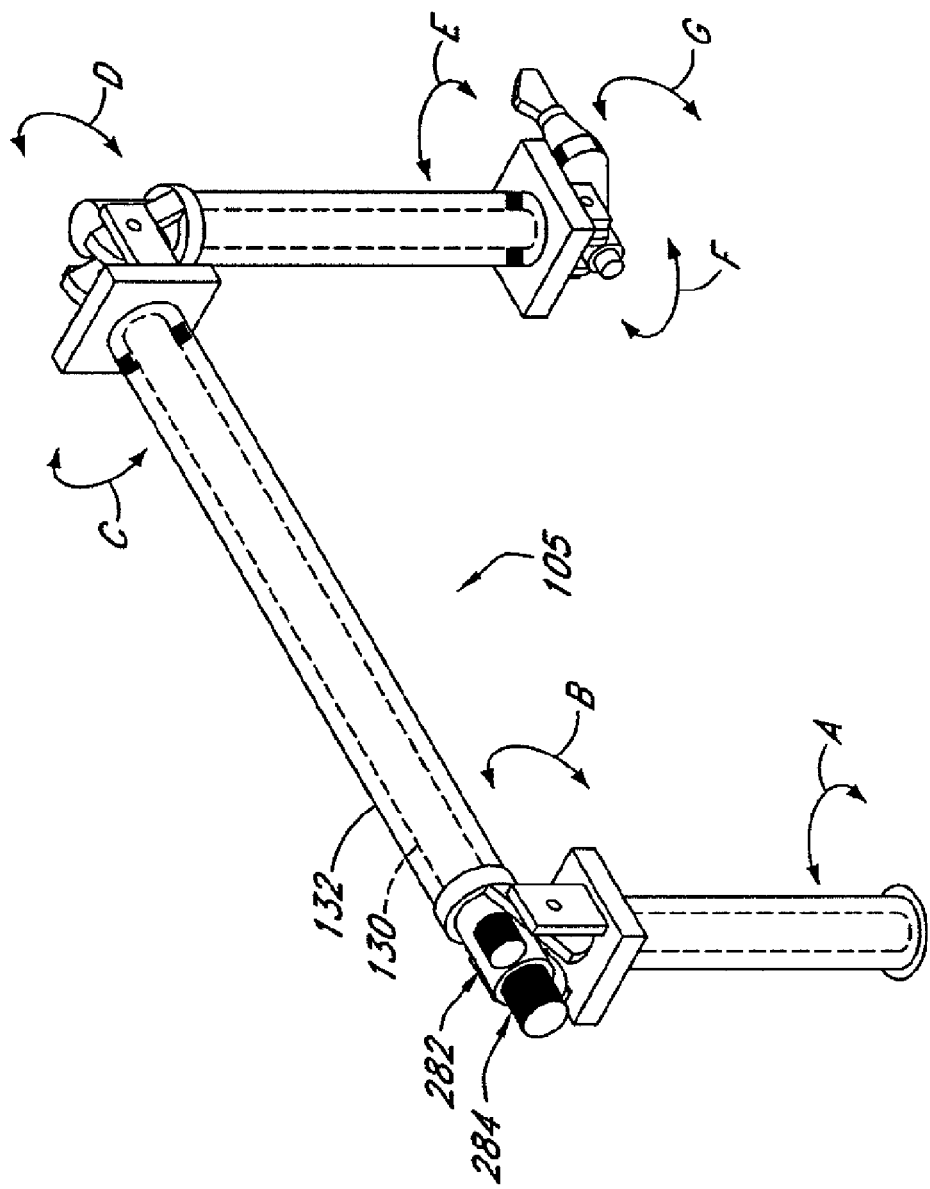
FIG. 2C illustrates an exemplary encoder arrangement along the measuring arm.

FIG. 2C illustrates another way to detect the position and alignment of the measuring arm components using an encoder-based approach. In this embodiment, encoders may used to independently ascertain the position and/or orientation of both the inner and outer members 130, 132 at selected locations about the measuring arm 105. For example, the angular degree of freedom denoted by the 'B' axis may be accurately assessed using two encoders which evaluate angular values for both the inner and outer members 130, 132 at the selected location. To evaluate the state of articulation of the measuring arm 105 about this axis, a first encoder 282 may be used to track the position and/or orientation of the inner member 130 and a second encoder 284 may be used to track the position and/or orientation of the outer member 132. As will be described in greater detail hereinbelow, the relative position of the inner and outer members 130, 132 may be associated on the basis of the first and second encoder angular values 282, 284 wherein the outer member 132 and associated encoder 284 define "course" positioning of the measuring arm 105 and the inner member 130 and associated encoder 282 define "fine" positioning of the measuring arm 105.

It will be appreciated that a number of possibilities exist for detecting changes in position and/or alignment between the inner and outer members 130, 132. Aspects of the invention as described herein are therefore conceived not to be limited solely to the use of strain gauges, pressure sensors, and/or encoder-based methods for detecting positional differences between these members 130, 132. Furthermore, in certain embodiments, the aforementioned components for positional detection may be used alone or in combination as desired without departing from the scope of the present teachings.

In one aspect, the aforementioned deformable characteristics of the compliant member 135 provide a limited range of positioning or alignment of the inner member 130 with respect to the outer member 132 even when the outer member 132 remains fixed in position. Thus, for a selected degree of freedom, positioning of the measuring arm 105 may be achieved by actuator driven movement of the outer member 132 wherein the associated encoder 284 may be used to determine the operation of the actuator and identify when the desired position of the outer member 132 has been achieved. Positioning of the outer member 132 directs movement of the inner member 130 such that when the outer member 132 has come to rest at a selected position, a state of equilibrium between the inner and outer members 130, 132 is achieved. When so positioned, the encoder 282 associated with the inner member 130 may be evaluated to determine its position and alignment relative to the outer member 132. To achieve a certain desired position of the inner member 130, the encoder 282 associated with the inner member 130 may be used to determine appropriate movements of the outer member 132 necessary to achieve the desired position. In one aspect, a feedback loop is established wherein the outer member encoders 284 and inner member encoders 282 operate in concert to achieve a selected position. Furthermore, these encoders 282, 284 may also be used to determine when the measuring arm 105 has become misaligned due to jarring, vibration or other physical perturbations and provide a means to reacquire a selected or desired position.

The dual encoder approach to position and orientation determination provides for improved measuring arm performance and accuracy as compared to conventional robotically assisted articulated CMMs. For each degree of freedom associated with the measuring arm, a discrete encoder pair may be used to resolve, monitor, and correct the position and alignment of the measuring arm 105 within the selected degree of freedom to achieve a highly accurate positioning system. Thus in various embodiments, individual inner and outer member encoder pairs may be associated with the 'A', 'B', 'C', 'D', 'E', 'F' and 'G' axis (show in FIG. 2A) and various combinations thereof to provide a means to accurately monitor arm position and alignment about each degree of freedom. Information acquired from each encoder pair may further serve as a basis to drive actuators either singularly or in combination to position the outer member 132 and thereby align the inner member 130 in a desired position and/or orientation.

In one aspect, the measuring arm 105 provides a self calibrating quality through the interaction of the inner member 130 and associated encoder 282 and the outer member 132 and associated encoder 284 where the location and motion information provided by each can be analogized to individual senses and can be used for purposes of "teaching" one another. This manner of operation may be analogized to how humans utilize the senses of sight and touch to refine movement when grasping an object.

Numerous different measuring arm/encoder configurations may be implemented to achieve the desired results of the aforementioned teachings. For example, the encoders 282, 284 associated with the 'B' axis may be located at substantially different positions from those shown in FIG. 2C while still operating in a manner which allows for monitoring and control of the inner and outer members 130, 132. As such, encoder positioning about each axis or degree of freedom is conceived to be not necessarily limited to the configurations shown and other encoder positionings are considered representative of embodiments of the present invention that may be readily appreciated by those of skill in the art. Additionally, the present invention is not necessarily limited to paired encoders for each degree of freedom and may incorporate additional encoders to monitor and direct the positioning of the inner and outer members 130, 132 thereby potentially improving instrument precision and/or accuracy. Furthermore, a "composite" encoder capable of simultaneously measuring two or more positionings (e.g. both inner and outer members together) may be used as a substitute for the individual encoders 282, 284 associated with the inner and outer members 130,132.

FIG. 3 illustrates an exemplary remote actuator configuration PCMM 100. In this embodiment, the actuators 305 used to drive the various articulation members 115 along the measuring arm 105 are housed or contained within the mobile unit 145. In this configuration, heat and vibration that might otherwise be associated with operation of the actuators 305 is contained within or dampened by the mobile unit 145. The actuator power used to operate the various articulation members 115 is further transmitted by the flexible drive cables 155 which are interconnected between the actuators 305 and the articulation members 115. Although illustrated as having a certain degree of "slack" within the power transfer cables 155 it will be appreciated that the power transfer cables 155 may be firmly and securely affixed to various sections of the measuring arm 105 in such a manner so as to minimize undesired movement and play within the power transfer cables 155. Thus the driving force generated by operation of the actuators 305 is efficiently transferred to the articulation members 115 in a controlled and reproducible manner. Alternatively, some degree of slack tolerance within the drive cables 155 may be desirable to provide a damping means for reflected loads resulting from operation of the actuators 305. Additionally, a flywheel or other inertial damping mechanism may be used in connection with the actuators 305 and drive cables 155 to offset the effects of reflected load in the drive cables 155.

In one aspect, the aforementioned actuator configuration 300 desirably improves PCMM performance by displacing sources of heat, vibration, and excess weight away from the measuring arm 105 itself. Additionally, as will be described in greater detail herein below the actuators 305 may be used to control movement of the measuring arm 105 and to respond to stimulus and feedback associated with the pressure sensors 280, encoders 282, 284 and compliant members 135 located at various positions throughout the measuring arm 105. In certain embodiments various encoders associated with the inner and/or outer members 130, 132 may be positioned within the mobile units 145 along with the actuators 305. Remotely located encoders are able to ascertain the angular values for the inner and outer members 130, 132 by directly engaging with the actuators 305 or drive cables 155 or by various other means so as to allow determination of the relative position of the measuring arm 105.

FIG. 4 illustrates another exemplary remote actuator configuration for the PCMM 100. In this embodiment, actuators 305 used to drive selected articulation members 115 are mounted at various positions about the measuring arm 105 and mobile unit 145. In one aspect, the location of each actuator 305 is displaced from the articulation member 115 which it is configured to operate and interconnected via an appropriate length of drive cable 155. For example, the articulation member(s) 115 associated with the elbow joint 210 may be driven by actuator(s) 410 positioned generally about the shoulder joint region 205. In a similar manner, the articulation member(s) 115 associated with the shoulder joint 205 may be driven by actuator(s) 415 remotely located near the base 140 of the measuring arm 105 or alternatively within or upon the mobile unit 145.

In one aspect, displacement of the actuator 305 from the articulation member 115 is it configured to operate desirably reduces vibrations and localized heat buildup in the regions of the articulation members 115. This manner of configuration is distinguishable from that of conventional CMM's wherein the actuator is integrated with, or located substantially adjacent to, the articulation member it operates. Such designs are inferior as they may result in localized heating and vibrational instability. Furthermore, the actuators themselves are a significant source of weight and may increase the overall load required to move and position the measuring arm 105. In various embodiments, larger actuators (e.g. those generating the most heat and vibration) are associated with directing the outer members 132 which drive the articulation members 115 located about the shoulder joint 205 and it is therefore desirable to locate these actuators 305 some distance away from the measuring arm 105 to reduce physical perturbations including heat and vibrations as well as reduce the overall weight of the measuring arm 105. Similarly, actuators 410 used to control the elbow joint 210 may be smaller than the shoulder actuators 415 and may be displaced near or about the shoulder joint 205 without significantly affecting the performance of the measuring arm 105. This general approach to displacing actuators 305 one or more arm sections away from the articulation member 115 they are designated to drive therefore has the desirable effect of reducing heat buildup, vibrations, and weight within the measuring arm 105. At the same time, this configuration maintains relatively short lengths of drive cable 155 between the actuator 305 and the outer members 132 and the articulation members 115 they drive.

In various embodiments, the actuator displacement distance may be adjusted as needed or desired to accommodate a variety of actuator placement configurations. For example, some actuators 305 may be positioned relatively short distances away from their associated articulation members 115. Thus, an actuator 425 used to drive an articulation member 115 located in the wrist joint 215 of the measuring arm 105 may be located a relatively short distance away from the wrist joint 215 as illustrated or alternatively may be displaced a further distance away from the wrist joint 215 such as along the arm section 430 or alternatively near the elbow joint 210. The exact distance that the actuators 305 are displaced from the associated articulation member 115 may therefore be configured as desired to reduce vibrations, heat buildup, and weight while at the same time maintaining a desired length of flexible drive cable 155 which insures accurate and efficient power transfer. From the foregoing, it will be appreciated that many possible actuator configurations and placement patterns exist which need not necessarily conform specifically to those illustrated. However, alternative actuator configurations and placement patterns which apply the principals of remote operation between the actuator and articulation member are considered but other embodiments of the present teachings. In various embodiments, the flexible drive cables 155 used to interconnect the actuators 305 and articulation members 115 may be substituted with other comparable or analogous means for transferring power. For example, rigid or semi-rigid drive cables may be used in place of the flexible drive cables 155 and may include drive shafts, wires, elongated coupling devices or other such components.

Figure 5:
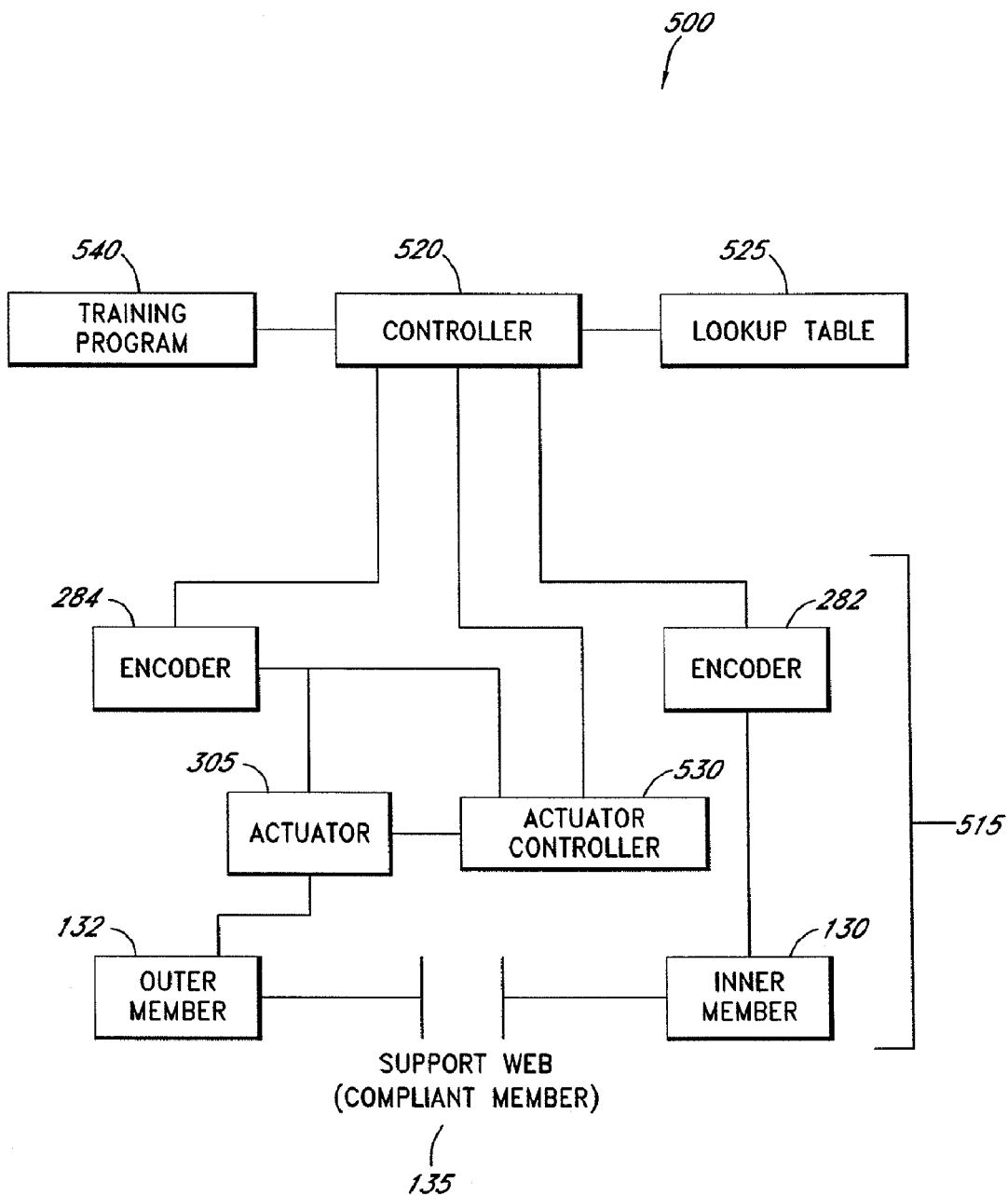
FIG. 5 illustrates a block diagram of the components that provide for feedback and control of the automated robotic measuring system.

FIG. 5 illustrates one embodiment of a control diagram 500 detailing the principle components of the PCMM 100 that provide for feedback and control of the measuring arm 105. In one aspect, the measuring arm 105 can be logically subdivided into a plurality of articulated sections 515 representative of selected degrees of freedom of movement within the measuring arm 105. Movement and/or alignment of the inner and outer members 130, 132 of the articulated section 515 may be determined using encoders 282, 284 which provide information that may be used to ascertain the position of the inner member 130 with respect to the outer member 132. As previously described, changes in the position or alignment of the inner member 130 with respect to the outer member 132 may be observable as a result of the qualities of deformability of the compliant member 135 which affords a degree of tolerance and moveability between the two members 130, 132.

For each articulated section 515, a first outer member encoder 284 may be used to determine the relative position and/or alignment of the outer member 132 and a second inner member encoder 282 may be used to determine the relative position and/or alignment of the inner member 130. The function and operation of encoders is known to those of skill in the art and is described in detail in U.S. Pat. No. 5,829,148 entitled "SPATIAL MEASURING DEVICE" previously incorporated by reference. In certain embodiments, each encoder 282, 284 provides information to a controller 520 which may be configured to ascertain the relative position of the inner and outer members 130, 132 using a datastore or lookup table 525.

The datastore or lookup table 525 associates encoder information relating to the position and/or orientation of the inner and outer members 130, 132 with respect to one another and thereby provides the current and desired positions of these members 130, 132. The lookup table 525 may further provide information to the controller 520 that is used to direct movement of the articulated section 515 in a desired manner based upon acquired information from encoders 282, 284 associated with the inner and outer members 130, 132.

The controller 520 receives information from the encoders 282, 284 which is used to establish the current position and/or alignment of the inner member 130 with respect to the outer member 132. Furthermore, the encoder information may also be used to establish the current position of the arm 105 in three dimensional space. Based upon this information, the controller 520 directs positioning of the selected components of the arm 105 through actuator-driven movement of the outer member 132 which in turn directs the positioning of the inner member 130. Additional details of how the lookup table 525 may be constructed and utilized will be provided in subsequent figures and discussion.

In various embodiments, the controller 520 directs measuring arm positioning at a selected position or degree of freedom by providing instructions to an actuator controller 530 which in turn directs the operation of the actuator 305 associated with the outer member 132. The actuator 305 is capable of positioning the outer member 132 in a desired position and/or orientation with a high degree of precision and control, either directly or indirectly through the aforementioned drive cable 155. Upon movement of the outer member 132, the inner member 130 is positioned via the transmission of force through the compliant member 135. As previously noted, a significant feature of the present teachings is the ability to robotically position the inner member 130 using the outer member 132 to provide the driving means without an actuator directly operating upon the inner member 130. This configuration provides for improved control and vibration damping while at the same time allowing the position and/or alignment of the inner member 130 to be monitored and adjusted as needed or desired.

In one aspect, the encoders 282, 284 provide the ability to not only resolve the current location of the inner and outer members 130, 132 of the measuring arm 105 but may also be used to determine alignment, strain, load or other physical parameters associated with the arm 105. While illustrated as having discrete encoders 282, 284 for the inner and outer member 130, 132 it will be appreciated that a singular encoder device or multiple encoders may be used for the purposes of identifying the position and/or orientation of the inner member 130 relative to the outer member 132. Additionally, for articulated sections 515 having multiple degrees of freedom of movement there may be additional control groupings (e.g. actuators, actuator controllers, encoders, etc.) contained within the articulated section 515 that operate in concert with one another.

The controller 520 directs how the selected articulated section 515 will be positioned based upon a feedback loop wherein a desired position of the inner member 130 is identified and actuator instructions are retrieved from the lookup table 525 and subsequently issued to drive the actuator 305 via the actuator controller 530. As the outer member 132 is positioned by the actuator 305, the encoders 282, 284 may provide information to the controller 520 as to the progress of the positioning of the articulated section 515. This information can be used to make corrections and/or adjustments in the positioning of the articulated section 515 or the arm 105 or to determine when the arm 105 has achieved a desired position and/or orientation.

The encoder(s) 282, 284 associated with the selected articulated section 515 may be configured to assess the positional state of the inner and outer members 130, 132 and relate this information in terms of angular values or cycles of rotation of each encoder 282, 284. Additionally, positional information may be obtained from pressure sensors or strain gauges 280 associated with the compliant members 135 between the inner 130 and outer members 132 of the measuring arm 105. Using this information, the encoders 282, 284 can be used to effectuate actuator operation to achieve a desired position or alignment of the measuring arm 105. For example, the controller 520 may determine that the inner member 130 is misaligned (as a result of jarring or vibrations) on the basis of increased compression or deformation of a particular compliant member 135 as indicated by an associated pressure sensor 280. Alternatively, the controller 520 may determine that the inner member 130 is out of alignment by evaluation of the information obtained from the encoders 282, 284 which may further be used in combination with information obtained from the pressure sensors 280.

The encoders 282, 284 may further direct the actuator 305 (through the actuator controller 520 or controller 520) to operate in a manner that alleviates the compression or deformation of the compliant member 135 or directs the outer and inner members 130, 132 to a selected position to thereby provide corrective movement of the measuring arm 105 returning it to a desired position. In one aspect, the aforementioned feedback loop may be used to automatically sense and correct deviations in measuring arm position. Additionally, the feedback loop may be utilized in routine alignment and positioning operations to finely control the movement of the articulated section 515 and measuring arm 105.

In various embodiments, the number of encoders utilized may be associated with the number of degrees of freedom of movement or rotational axis of the PCMM. For example, each degree of freedom of movement of the measuring arm 105 may be evaluated and monitored using a single inner/outer member encoder pair that may be used to track positioning and provide feedback as to deviations and misalignments of the articulated sections 515 or measuring arm 105. In other embodiments, additional encoders may be associated with one or more of the identified degrees of freedom of movement to provide redundant encoder analysis and feedback. Incorporation of multiple encoders in this manner may improve the accuracy of movement tracking by the encoders and provide for increased positioning sensitivity and accuracy.

The aforementioned manner of identifying, tracking, and effectuating measuring arm position through the use of inner and outer member encoder evaluation improves error mapping and self calibration characteristics of the measuring arm as compared to conventional measuring arms. In one aspect, the information contained in the lookup table 525 may be developed using a training program 540. In various embodiments, the training program 540 associates encoder/actuator information with positional information through a plurality of selected positionings of the measuring arm 105 for which the encoder/actuator information used to achieve the arm position 105 is identified. This information may serve as a calibration reference to detect and direct the movement or positioning of the measuring arm 105 by evaluating encoder readings from the inner and outer members 130,132 and comparing this information to data stored in the lookup table 525. Additional details of how the lookup table 525 may be created and the training program 540 utilized will be described in greater detail hereinbelow.

In various embodiments, the controller 520 may direct the operation of the actuator 305 both in terms of speed and duration in order to effectuate desired angular movements of the selected articulated section 515 and also the rate at which the movement occurs. This manner of control over each articulated section 515 provides for enhanced functionality and may be used to direct different modes of operation of the PCMM 100.

In various embodiments, a single controller may be associated with a plurality of different articulated sections 515. For example, a single controller may direct and coordinate the motion and alignment of the various sections of the measuring arm 105 including the shoulder joints 205, elbow joints 210, wrist joints 215, and the coordinate acquisition member 110. Alternatively, multiple controllers may be used wherein each controller is associated with one or more selected articulated sections 515 and coordinate the movement and positioning of those sections 515 alone. Additionally, a "master" controller may be used to direct the operation and activities of a plurality of independent controllers such that the movement and positioning of the arm 105 may be centrally coordinated.

Figure 6:
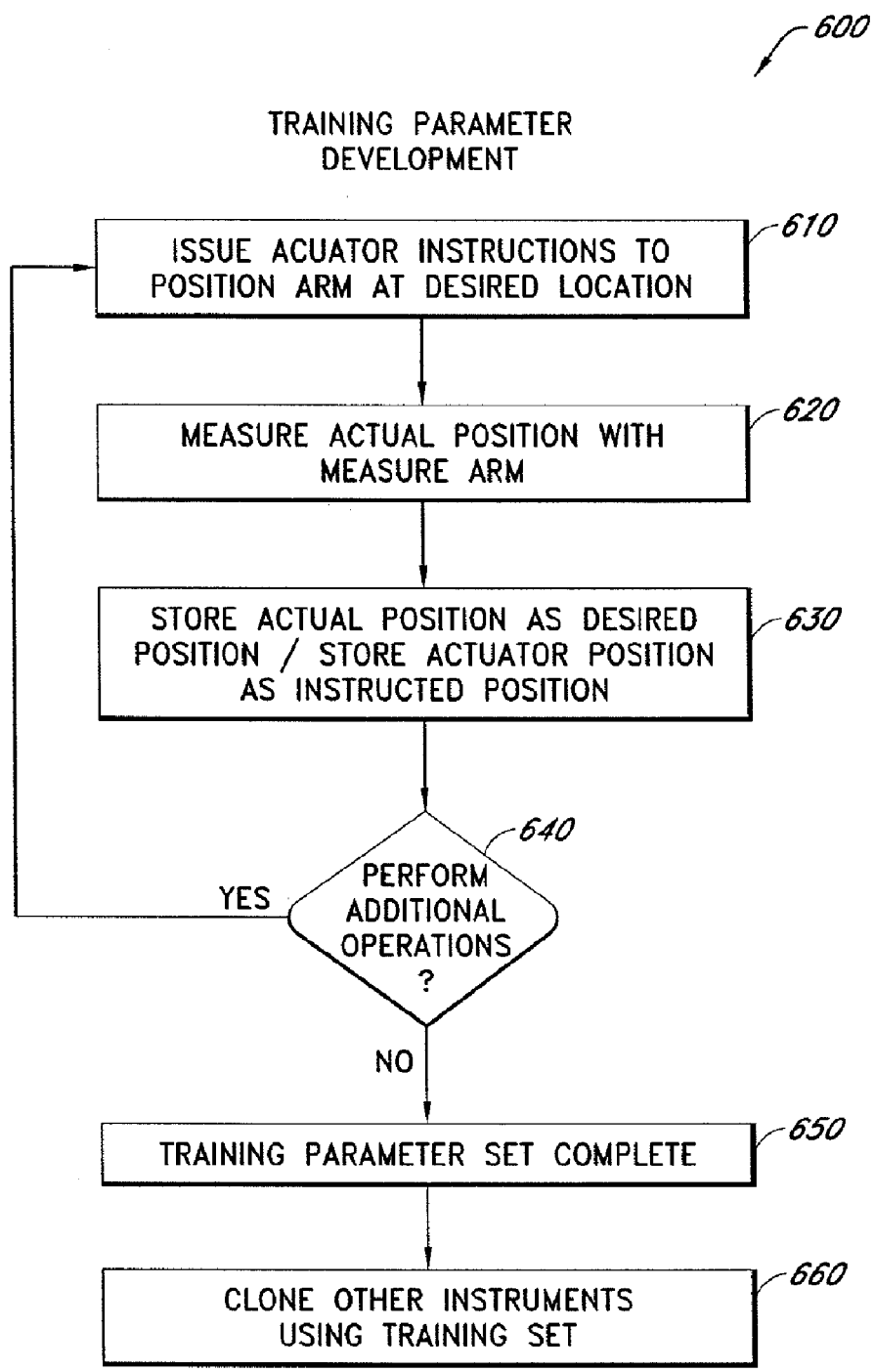
FIG. 6 illustrates a flowchart for developing a training parameter set for the automated robotic measuring system.

FIG. 6 illustrates a flowchart 600 for developing a training parameter set for the PCMM 100. The training parameter set comprises information stored in the lookup table 525 and may correspond to a plurality of angular values for each degree of freedom of the measuring arm 105 or rotational cycles for each encoder that may be used to achieve the selected angular values. This information may be used to determine the current position of the measuring arm 105 and provide instructions to the controller 520 associated with each articulated section 515 which direct the measuring arm 105 to a desired location. In certain embodiments, the training parameter set provides an error mapping functionality that may be used for purposes of self-calibration and adjustment by resolving the current and desired positional information.

In general, the training parameter set defines the characteristics and positional adjustment parameters associated with a particular instrument or configuration. These parameters may be applied to similar instruments or configurations such that the parameters developed for one instrument may be used to train or clone another instrument. The portable nature of the parameter set desirably provides a means to calibrate multiple instruments in a more efficient manner than by calibrating each instrument independently of one another.

In one aspect, the training parameter set represents a relatively large number of values relating to a collection of articulations of the measuring arm 105 in three dimensional space. This information may comprise between approximately 100-10000 different articulations of the measuring arm 105 and the corresponding encoder values relating to these articulations. Consequently, it is desirable to provide the ability to "share" this information between different instruments such that the training parameter set need only be developed on a first instrument. This feature improves the speed with which instrument calibrations may be performed in subsequent instruments and represents a significant time saving feature. Of course, it will be appreciated that the training parameter set need not necessarily be shared between instruments and can be developed independently for each instrument.

The development of the training parameter set commences in state 610 wherein instructions for positioning the measuring arm 105 in a selected location and orientation are identified and issued to the controller 520 to effectuate the desired movements of the outer member 132 which in turn aligns and positions the inner member 130 as previously described. In one aspect, these instructions relate to specified angular values for each degree of freedom of the outer member 132 and/or encoder cycles associated with the encoders 284 and actuator controllers 530 of the outer member 132.

Once positioned according to these instructions, the actual location and orientation of the inner members 130 of the measuring arm 105 are determined in state 620. This information may include the values associated with the encoders 282 of the inner member 130 for each articulation member 515 as well as geometry information acquired by the probe 110 which identifies its location in three dimensional space. Thus, the training parameter set associates a collection of outer member encoder values with a corresponding collection of inner member encoder values. As will be described in greater detail hereinbelow this information desirably provides a means to not only direct a desired positioning and alignment of the measuring arm 105 but also to resolve the current position and alignment of the measuring arm 105 on the basis of the stored encoder values.

In state 630, entries in the lookup table 525 are populated by associating each set of encoder values for the outer members 132 (e.g. for each axis, degree of freedom, or join member) with encoder values for the inner members 130. In this manner, encoder values or instructions for actuator assisted positioning of the measuring arm 105 via the outer member 132 may be determined to achieve a plurality actual measuring arm locations.

Stored entries in the lookup table 525 may be subsequently accessed by the controller 520 to effectuate accurate and precise movement of the measuring arm 105. For example, when the measuring arm 105 is to be located in a selected position and orientation, the controller 520 may access an appropriate entry in the lookup table 525 corresponding to the desired location (specified by the inner member encoder values) and drive the actuators 305 associated with the outer members 132 to achieve the corresponding outer member encoder values. Utilization of the lookup table 525 in this manner therefore provides a deterministic means to position the arm in a robotically controlled manner without the need to manually "guide" the arm to a desired location.

As each entry in the lookup table 525 relates to a singular position or orientation of the measuring arm 105 a plurality of such entries is desirably determined to define a range of potential measuring arm articulations that may be accessed to position the measuring arm in three dimensional space. Thus, to generate a "complete" lookup table 525 one or more additional operations 610, 620, 630 may be performed as illustrated by decision state 640.

In one aspect, lookup table entries determined according to the aforementioned steps may be iteratively performed by the training program 540 which specifies a series of outer member encoder values to be associated with corresponding inner member encoder values when the measuring arm 105 is positioned or oriented. For example, the training program 540 may specify a collection of outer member encoder values in which each axis or degree of freedom of the measuring arm 105 is positioned a pre-selected amount and the associated inner member encoder values corresponding to these positions is determined and stored in the lookup table 525. In various embodiments, increasingly large numbers of entries in the lookup table 525 improve the "resolution" of positioning the measuring arm 105 and may comprise between 1000-10000 entries to provide relatively high resolution in a seven axis measuring arm system. In various embodiments, the use of the training program 540 desirably alleviates the need for an operator to manually position the measuring arm 105 when populating the lookup table 525 however it will be appreciated that manual selection and determination of lookup table entries may also be performed as desired.

In certain embodiments, training parameter entry determination may be performed multiple times for selected locations to establish correction factors, offset values, or variability ranges which may be also stored in the lookup table 525. In this manner, the lookup table 525 may be refined and validated prior to use or dissemination to other instruments.

Once development of the training parameter set and lookup table 525 population is complete (state 650), this information may be re-used as a reference for other similar instruments. For example, as shown in state 660, a comprehensive training parameter set may serve as a basis for cloning other instruments wherein the lookup table 525 is accessed by a similar instrument without redeveloping the entire contents of the training parameter set and lookup table 525. In this fashion, subsequent cloned instruments may be more rapidly calibrated as they are able to make use of the existing training parameter set.

The time saving aspect of lookup table 525 development and training parameter portability can be readily appreciated when the number of individual calibration points used for instrument calibration is large. For example, it is not uncommon for between approximately 1000-10000 individual calibration points to be used during instrument calibration. Training parameter set development need only be performed once however and this information may be shared between similar or compatible instruments thus alleviating the need to re-perform these operations for each instrument. Such a manner of calibration is a notable improvement over existing or conventional methods which require each instrument to be individually calibrated.

In an analogous manner other instructions or parameter sets may be developed and cloned into similar or compatible instruments. For example, error correction parameters, physical perturbation adjustments, and other defined measuring arm movements and positionings may be established on a reference instrument and the parameter set used to "teach" other instruments alleviating redundant determination of the instructions or parameter set.

Application of the aforementioned principals in the context of CMM and PCMM instruments can be expected to markedly improve measuring arm positioning accuracy and precision as compared to many conventional devices. In various embodiments, the sensitivity of a measuring arm employing an encoder driven outer member structure can result in sensitivity on the order of approximately 10-50 microns or better. Additionally, the reproducibility of measuring arm positioning is superior to conventional systems resulting in part from the feedback loop created by the inner and outer member encoders 282, 284 as well as the use of the lookup table 525 for purposes of directing the actuators 305.

FIG. 7 illustrates an exemplary lookup table entry 700 that may be generated and utilized as described above. In one aspect, the lookup table 525 comprises a plurality of such entries 700 which relate outer and inner encoder values 705, 710 for each axis or degree of freedom 715 of the measuring arm 105 based upon a selected position and/or orientation of the measuring arm 105.

Each entry 700 may comprise information in addition to the encoder values 705, 710 which may include for example: a gear ratio 720 associated with the outer member for each axis 715, an outer member encoder resolution 725 and an inner member encoder resolution 730 (illustrated as cycles per revolution of the encoder), and an approximate articulation angle 735 for each axis of the outer member 132 based upon the specified encoder values 705. This information in addition to the encoder values 705, 710 may be used for a variety of purposes including performing interpolation operations to identify appropriate encoder and actuator positionings that may be used to achieve measuring arm positions or orientations that are not found in the lookup table 525. In such instances, a best fit or closest match approach may be used to identify suitable actuator movements based upon existing information contained in the lookup table 525.

It will be appreciated that the aforementioned table entry 700 represents but one embodiment of the type of information that may be stored in the lookup table 525. The nature of the contents of the lookup table 525 may deviate somewhat from that illustrated while still achieving similar results in relating inner and outer member encoder positions or values. In general, the lookup table 525 serves to not only provide a means to determine the appropriate positioning of the measuring arm 105 but may also be used to ascertain the current position of the measuring arm 105 on the basis of the actuator information.

Additionally, the interpolation operations may identify two or more entries 700 in the lookup table 525 and use the information contained therein to develop a new entry which may be stored in the lookup table 525 and used to position the measuring arm 105. These extrapolation operations therefore may be used to not only position the measuring arm 105 but also create the potential for a dynamic or evolving lookup table 525 which may incorporate additional entries beyond those initially identified during training parameter development.

In various embodiments, the aforementioned robotic measuring system 100 may be configured to operate in an assisted-movement mode or "joystick-enabled" mode. In this mode of operation, positioning of the measuring arm 105 may be accomplished by an operator who guides the apparatus in various desired directions and/or orientations by exerting pressure or force upon portions of selected inner members 130. In one embodiment, the system 100 is configured to detect and be responsive to relatively slight movements of the inner member 130 without requiring the operator to exert a force sufficient to move the entire measuring arm 105 and associated hardware components. A high level of sensitivity is achievable in detecting movements or changes in position of the inner member 130 as a result of the deformable characteristics of the compliant member 135 and the position detecting means of the pressure sensors, strain gauges, and or encoders as described above.

For example, a slight manually-exerted force upon selected inner members 130 may be detected by the system 100 which may ascertain both the relative amount of force applied and direction of movement against the complain member 135. The system 100 may respond with selected actuator-driven movements of the measuring arm 105 in the general direction and orientation of the manually exerted force providing means for the operator to "guide" the movement of the measuring arm 105 with relatively little effort.

Guided movement or positioning of the measuring arm 105 in the aforementioned manner may be accomplished by controller-based monitoring of the position and orientation of the measuring arm 105 using information provided by encoders, pressure sensors, and/or strain gauges. In one aspect, the controller 520 may detect an exerted force upon the measuring arm components based upon a change in position and/or orientation of the inner members 132 from an established or static position. The magnitude of the exerted force used to initiate assisted-movement may be configured as desired and may be relatively small, wherein only a slight movement of the inner member 130 with respect the outer member 132 is needed to effectuate a degree of robotically driven movement.

In one exemplary configuration, an operator may exert a force against a selected section of the inner member 132 in a desired direction. This force need not necessarily be large enough to move the entire measuring arm 105 but rather be sufficient to result in some degree of movement of the inner member 130. The controller 520 may be configured to discern the relative direction of the exerted force based upon what support webs 135 are deformed and/or the change in position of the inner member 130 with respect to the outer member 132 (as detected by the encoders, pressure sensors, and/or strain gauges). Upon determination as to the direction of the exerted force, the controller 520 may instruct appropriate actuators 305 to direct movement of the measuring arm 105 at a preselected rate of speed and/or distance for a selected period of time or until the exerted force is no longer detected. Based on this principal, manually-guided movement of the measuring arm 105 can be accomplished to facilitate manual positioning of the measuring arm 105 in such a manner so as to significantly reduce operator fatigue and effort in aligning and calibrating the instrument 100.

In various embodiments, a selected threshold level of exerted force or detected movement may be required to initiate the assisted-movement mode. Likewise, the magnitude of the exerted force or detected movement may be assessed to determine the characteristics of the assisted-movement to be used (e.g. speed, duration, distance, orientation, etc.). In still other embodiments, changes in position of the various measuring arm components which fall below the threshold level may be perceived as perturbations which may be corrected for by issuing compensatory instructions to selected actuators 305 to realign or position the measuring arm 105 in a desired manner to offset the detected perturbation(s).

In addition to providing assisted-movement of the measuring arm 105, the controller 520 may also be configured to resist movement and maintain current positioning of the measuring arm 105. For example, the operator may desire the measuring arm 105 to retain a selected position or compensate for undesired movement of the measuring arm 105. To accomplish this, the controller 520 may be configured to maintain a selected positioning and/or orientation of the measuring arm 105 and actively resist applied or exerted force against the various measuring arm components through application of an actuated controlled "counter-force". Deviation of the measuring arm 105 from a desired position may also be corrected by the controller 520 which utilizes the lookup table 525 to return the measuring arm 105 to the desired position.

From the foregoing description it will be appreciated that the measuring arm 105 may be positioned and oriented in a number of different ways including substantially autonomous modes wherein the measuring arm is robotically positioned as determined by the controller 520. Additionally, the measuring arm 105 may be positioned in a semi-automated or manually assisted mode in addition to conventional manually operated modes without robotic assistance. Taken together the features and functionalities of the system as described by the present teachings provide a number of significant improvements over conventional articulated measuring arm configurations. In particular, robotically controlled and/or assisted movement of the measuring arm 105 provides the potential for improved accuracy and precision in acquisition of coordinate data.

It will be further appreciated that the positioning and alignment detection means in which an inner arm member is driven by an outer arm member may be adapted for purposes other than coordinate data acquisition. It is conceived that configurations employing an articulated arm having a instrument, tool or other component that is to be finely positioned may be adapted to for use with the present teachings to provide improved response, control, and accuracy in using the tool or other component. For example, in surgical applications a conventional metal or laser scalpel may be adapted for use with a measuring arm wherein the positioning and alignment system of the present teachings provides accurate orientation and manipulation of the scalpel such that surgical procedures can be performed in an autonomous or semi-autonomous manner with a high degree of precision.

Although the above-disclosed embodiments of the present teachings have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. A positioning system comprising:
    an articulated supporting arm comprising a plurality of jointedly interconnected support arm segments moveable about a plurality of axes;
    a plurality of compliant members positioned on said supporting arm; and
    an articulated measuring arm comprising a plurality of jointedly interconnected measuring arm segments capable of a plurality of degrees of freedom of movement and supported by said compliant members,
    wherein said compliant members provide a yielding characteristic that resists a degree of compressibility of each compliant member when a force is applied to one of the articulated supporting arm and the articulated measuring arm, and
    wherein at least one support arm segment at least partially encloses at least one measuring arm segment and at least one of said compliant members is positioned between said at least one support arm segment and said at least one measuring arm segment.

2. The positioning system of claim 1, further comprising: at least one alignment detector configured to detect the alignment between the articulated supporting arm and the articulated measuring arm.

3. The positioning system of claim 1, wherein at least one of the plurality of compliant members is configured to dampen vibration between the articulated supporting arm and the articulated measuring arm.

4. The positioning system of claim 1, wherein at least one of the plurality of compliant members is composed of a thermally insulating material.

5. The positioning system of claim 1, wherein at least one of the compliant members is formed from a resilient deformable material.

6. The positioning system of claim 5, wherein the resilient deformable material comprises one of a soft plastic and a rubber material.

7. The positioning system of claim 1, wherein at least one of the compliant members comprises a bushing.

8. The positioning system of claim 1, wherein at least one support arm segment completely encloses at least one measuring arm segment.

9. A positioning system comprising:
    an articulated supporting arm comprising a plurality of jointedly interconnected support arm segments moveable about a plurality of axes;
    a plurality of compliant members positioned on said supporting arm;
    an articulated measuring arm comprising a plurality of jointedly interconnected measuring arm segments capable of a plurality of degrees of freedom of movement and supported by said compliant members;
    a plurality of drive cables connected to the supporting arm and configured to cause a motion of the supporting arm; and
    a plurality of motors connected to and configured to control the drive cables.

10. The positioning system of claim 9, further comprising a case comprising the motors such that the motors are positioned a distance from the articulated supporting arm they actuate.

11. The positioning system of claim 9, further comprising sensors on the articulated supporting arm that provided feedback to the actuators to at least partially control the motors.

* * * * *